Oct. 8, 1957     H. J. CROMWELL     2,808,815
WINDSHIELD WIPER MOTOR
Filed Nov. 27, 1953
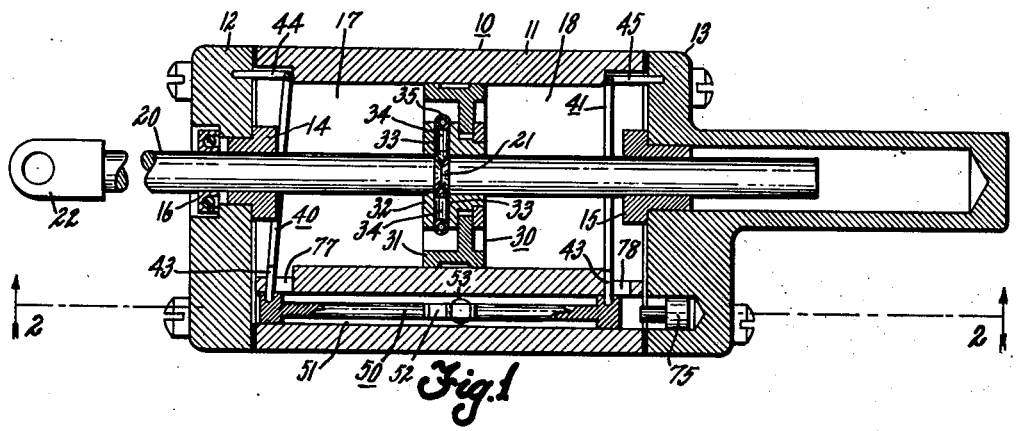
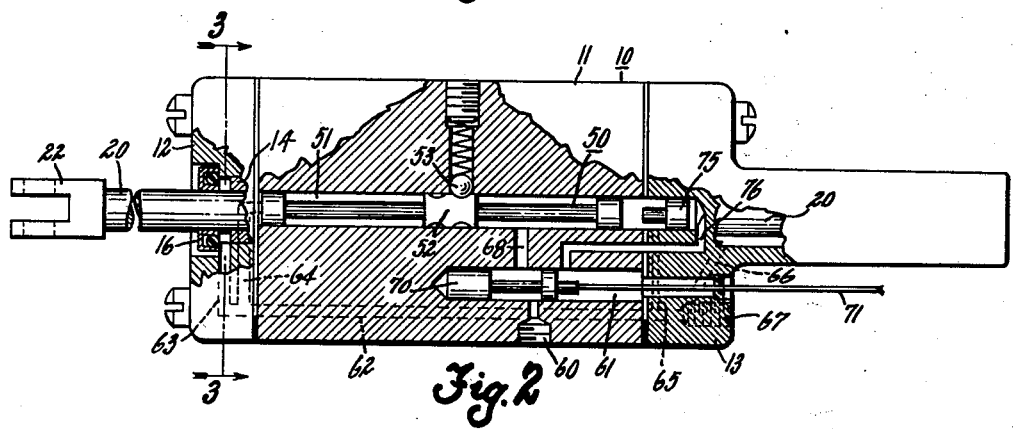
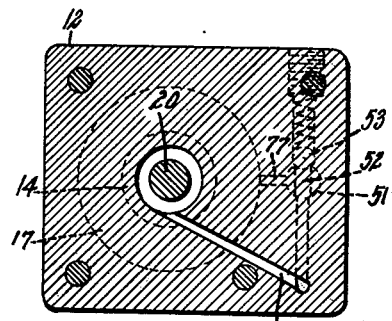
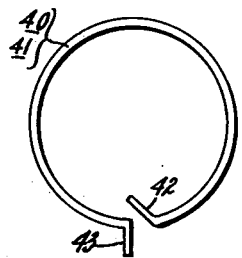
INVENTOR.
HAROLD J. CROMWELL
BY Craig V. Morton
HIS ATTORNEY

United States Patent Office 2,808,815
Patented Oct. 8, 1957

2,808,815

WINDSHIELD WIPER MOTOR

Harold J. Cromwell, Anderson, Ind., assignor to General Motors Corporation, Detroit, Mich., a corporation of Delaware Application November 27, 1953, Serial No. 394,772

9 Claims. (Cl. 121—164)

This invention pertains to fluid motors, and particularly to fluid motors for actuating vehicle windshield wipers.

Heretofore, numerous fluid motors have been developed to actuate vehicle windshield wipers. Moreover, a multitude of prior fluid motors include means for varying the length of the piston stroke adjacent one end of the cylinder so as to provide means for parking the wiper blades out of the normal range of vision. However, prior motors fail to provide any means for preventing damage to the linkages and/or power transmission in the event of an overload being imposed on the motor. Accordingly, among my objects are the provision of a fluid motor for actuating windshield wipers including means for increasing the stroke thereof to park the wiper blades; the further provision of a fluid motor including means for freeing the piston upon the imposition of an overload; and the still further provision of a fluid motor including automatic valve means for controlling and effecting continuous operation of the motor.

The aforementioned and other objects are accomplished in the present invention by providing means for freeing the motor piston from the piston rod when the rod and its associated transmission is subjected to an overload. Specifically, the fluid motor includes a cylinder having disposed therein a reciprocable piston capable of fluid pressure actuation in either direction. Moreover, although the instant motor is specifically designed for operation by hydraulic fluid under pressure, it is to be understood that this is only by way of example and not by way of limitation. The piston is releasably attached to a piston rod which projects through both end walls of the cylinder, one end of the rod being designed for operative connection to a transmission or linkage arrangement. A valve actuating spring is mounted adjacent each end wall of the cylinder, which spring is adapted for engagement by the piston adjacent the ends of its stroke. The springs automatically control the position of a cycling or operating valve and thereby maintain continuous reciprocation of the piston when the motor is actuated. The motor also includes a servo actuated parking plunger for precluding actuation of the cycling valve when parking is desired. In addition, the motor includes a manually operable control valve for establishing the operating speed of the motor and for controlling the actuation of the parking plunger.

Further objects and advantages of the present invention will be apparent from the following description, reference being had to the accompanying drawing wherein a preferred embodiment of the present invention is clearly shown.

In the drawing:

Fig. 1 is a longitudinal, sectional view of a fluid motor constructed according to this invention.

Fig. 2 is a view, partly in section and partly in elevation, taken along line 2—2 of Fig. 1.

Fig. 3 is a sectional view taken along line 3—3 of Fig. 2.

Fig. 4 is a view, in elevation, of one of the valve actuating springs.

With particular reference to Fig. 1, it may be seen that the fluid motor includes a cylinder 10, which comprises a tubular member 11 having attached thereto end members 12 and 13 by means of screw devices. End member 12 has an opening through which one end of a piston rod 20 projects, the end member being provided with a bushing 14 and a fluid seal 16. The end member 13 is provided with an elongated recessed portion which receives the free end of the piston rod 20, the member 13 also being provided with a bushing 15.

A piston assembly 30 is disposed within the cylinder, the piston assembly being capable of fluid pressure actuation in either direction. The piston assembly 30 comprises a head member 31, and a hub 32, the head being loosely supported on a hub 32 so as to permit limited radial movement therebetween. The hub 32 is formed with a plurality of circumferentially spaced radial openings 33 within which plungers 34 having tapered ends are disposed. The tapered ends of the plungers 34 engage a V-shaped annular groove 21 in the piston rod 20 and thereby form a releasable detent means for coupling the piston 30 to the rod 20. The plungers 34 are maintained in engagement with the V-groove 21 by means of a garter spring 35, which circumscribes and engages the outer ends of the plungers. The purpose of the detent means, constituted by the plungers 34 and the groove 21 together with the spring 35 will be dealt with hereinafter.

As is seen in Fig. 1, annular springs 40 and 41 are situated adjacent each end of the tubular member 11. The annular springs 40 and 41 are of identical construction, and, as shown in Fig. 4, are provided with a tang 42 and an outturned end 43. In addition, pins 44 and 45, carried respectively by end members 12 and 13, are provided for positioning the springs 40 and 41 within the tubular member 11. As is seen in Figure 1, the pins 44 and 45 position the springs 40 and 41 so that their closed ends normally abut internal shoulders formed on the tubular member 11.

The outturned ends 43 of the springs 40 and 41 are received in opposite ends of a valve rod 50, which is mounted for reciprocable movement in a longitudinal passage 51 of the tubular member 11. The tangs 42 of the springs 40 and 41 project into the opening defined by the tubular member 11 and into the path of the piston 30 so as to be engaged and deflected thereby.

With reference to Figure 2, it may be seen that the valve rod 50 is formed with a rectangular portion 52 having axially spaced grooves. The portion 52 is arranged so that either of its grooves will receive a spring pressed ball 53 disposed in a radial opening formed in the tubular member 11. The spring pressed ball 53 and the grooves in the portion 52 constitute a detent mechanism for positioning the rod 50, which constitutes a cycling valve for the fluid motor.

As is seen in Fig. 2, the tubular member 11, constituting the side walls of the cylinder 10, is formed with an inlet opening 60 through which fluid under pressure may be admitted to a recess 61, the tubular member also being formed with a longitudinal passage 62, which communicates with a pair of passages 63 and 64 formed within end member 12. The passage 62 also communicates with a pair of passages 65 and 66 formed within the end member 13, and with an outlet port 67. A manually positionable control valve 70 is supported for reciprocable movement within the bore 61, the valve 70 including a pair of spaced lands separated by an annular channel. The valve 70 may be moved by actuation of a Bowden wire 71, which is depicted as extending through the end member 13 in Fig. 2.

The passage, or bore, 51 on the tubular member 11 also has disposed therein a plunger 75, which is capable of servo actuation, and constitutes the parking plunger for the fluid motor. As is seen in Fig. 2, the chamber of the plunger 75 is connected by a passage 76 to the bore 61. The bore 61 is also connected by a passage 68 to the bore 51. Moreover, as is seen in Fig. 1, the bore 51 may be placed in communication with either chambers 17 or 18 of the cylinder, depending upon the position of the valve 50 within the bore 51.

With reference to Fig. 3, it may be seen that passage 63 of end member 12 communicates with the space between the fluid seal 16 and the rod bushing 14, the purpose of this passage being to relieve pressure fluid on the seal 16. The passage 64 communicates with chamber 17 of the cylinder 10 and provides a path for the drain of fluid from chamber 17 when pressure fluid is being applied to chamber 18. The passage 64 communicates with one end of the bore 51, the bore having communication with cylinder chamber 17 through port 77. In a similar manner, the passage 66 in the end cap 13 is provided for draining fluid from the recessed portion of the member 13, while the passage 65 communicates with bore 51. The bore 51 also communicates with chamber 18 of the cylinder through a port 78.

*Operation*

In operation, the piston rod is attached to suitable windshield wiper linkage or transmission, not shown, by means of the clevis 22. When it is desired to operate the motor and maintain the piston 30 in a state of continuous reciprocation, the Bowden wire 71 is actuated to move the valve 70 to the position shown in Fig. 2. Thus, fluid under pressure, which may be oil, is admitted through port 60 to the bore 61 and, thence, through passage 68 to the bore 51. Now inasmuch as the portion 52 is rectangular, as shown in Fig. 3, fluid under pressure is admitted to the entire length of bore 51 so that it may be admitted to either of the cylinder chambers 17 or 18. With the valve 50 in the position of Figures 1 and 2, fluid under pressure is communicated to chamber 17 through port 77, while chamber 18 is connected to drain through port 78, passage 65, and port 67. Consequently, the piston 30 will move to the right, as viewed in Fig. 1. Adjacent the end of its stroke, the piston 30 will engage the tang 42 of the spring 41, thereby actuating the valve 50 and moving the same to the right so as to connect chamber 18 to the bore 51, while connecting chamber 17 to drain. Consequently, the piston 30 will now move to the left, as viewed in Fig. 1, until it engages the tang 42 of spring 40, whereupon the valve 50 will be moved to the left so as to re-establish the connection of chamber 17 to bore 51, and the chamber 18 to drain. In this manner, the piston 30 is maintained in a state of continuous reciprocation, the reciprocative speed thereof being determined by the position of the small land on the valve 70, which may throttle the inlet port 60.

When it is desired to stop the wiper motor and park the wiper blades, not shown, the Bowden wire 71 is moved to the right so that passages 68 and 76 are connected with port 60 through chamber 61. Thus, pressure fluid is admitted behind the servo actuated plunger 75 so as to move its projecting rod into engagement with the end of valve 50. Consequently, the valve 50 will be moved to the position shown in Figs. 1 and 2, if it is not already in such a position, whereupon the piston 30 will be moved to the right end of the cylinder, as viewed in Fig. 1, by reason of chamber 18 being connected to drain and chamber 17 being connected to the source of pressure fluid through passages 68, 51 and port 77. However, by reason of the plunger 75 having engagement with the end of valve 50 when the piston 30 engages and deflects the spring 41, the valve 50 will not be moved to the right, and, hence, the piston 30 will be moved into engagement with the bushing 15, thereby increasing the stroke of the piston 30 to facilitate parking of the wiper blades, not shown, out of the normal range of vision. Piston 30 will be maintained in this parked position as long as pressure fluid is applied behind the servo actuated plunger 75, which is done as long as the control valve 70 is in a position wherein the larger land thereof blocks communication between port 60 and passage 68.

In certain instances, it may not be desirable to positively maintain the piston in contact with the bushing 15 by pressure fluid in chamber 17, in which case, the valve 70 may be moved further to the right so that port 60 is blocked, thereby releasing the pressure on the parking plunger 75. However, in other instances, it may be desirable to maintain pressure in the chamber 17 so as to prevent movement of the wiper blades, not shown, which are operatively connected with the piston rod 20, due to external forces such as wind, etc.

In the event the piston rod 20 is subjected to an overload, the plungers 34 will move radially outward, which movement is permitted by reason of their tapered ends, so as to free the piston 30 from the rod 20. In this manner, any possible damage to the transmission, which may attend an overloaded condition, will be avoided, and the piston will merely be reciprocated in the cylinder free of the piston rod 20.

While the embodiment of the present invention as herein disclosed, constitutes a preferred form, it is to be understood that other forms might be adopted.

What is claimed is as follows:

1. A fluid motor comprising in combination, a cylinder having disposed therein a movable piston capable of fluid pressure actuation in either direction, valve means for controlling the application of fluid pressure to opposite sides of said piston so as to maintain said piston in a state of continuous movement, means including a pair of springs for operatively interconnecting the piston and said valve means so as to actuate the said valve means adjacent each end of the piston stroke, and manually controlled means engageable with said valve means so as to prevent movement thereof in one direction to interrupt piston movement.

2. A fluid motor comprising in combination, a cylinder having disposed therein a reciprocable piston capable of fluid pressure actuation in either direction, valve means operatively associated with an actuated by movement of said piston for maintaining said piston in a state of continuous reciprocation throughout a predetermined stroke, and means engageable with said valve means for precluding the actuation of said valve means by said piston so as to increase the length of the stroke of said piston, said means including a servo actuated plunger.

3. A fluid motor comprising in combination, a cylinder having disposed therein a reciprocable piston capable of fluid pressure actuation in either direction, valve means for controlling the application of fluid pressure to opposite sides of said piston, an annular spring disposed within said cylinder adjacent each end thereof, each spring having an inwardly extending tang portion and an outturned end portion, said outturned end portions being operatively connected with said valve means, said tang portions being engageable by said piston adjacent the ends of its running stroke for actuating said valve means to maintain said piston in a state of continuous reciprocation, and means operatively associated with said valve means for precluding actuation thereof by said piston so as to increase the length of the stroke of said piston, said means including a servo actuated plunger.

4. The combination set forth in claim 3 wherein detent means are provided for releasably retaining the valve means in a predetermined position when the piston is not in engagement with either of the springs.

5. A fluid motor comprising a combination, a cylinder having disposed therein a reciprocable piston capable of fluid pressure actuation in either direction, valve means operatively associated with and actuated by movement of said piston for maintaining said piston in a state of continuous reciprocation throughout a predetermined stroke, means operatively associated with said valve means for precluding actuation thereof by said piston so as to increase the length of the stroke of said piston, said means including a servo actuated plunger capable of movement into engagement with said valve means so as to preclude actuation thereof by said piston, and a manually operable valve for controlling the application of fluid pressure to said servo actuated plunger.

6. The combination set forth in claim 5 wherein said valve means and said servo actuated plunger are mounted for movement within a common bore formed in the cylinder, and wherein said piston divides said cylinder into two chambers which are connected by ports to the bore of said valve means.

7. A fluid motor including in combination, a cylinder having disposed therein a movable piston capable of fluid pressure actuation in both directions, a reciprocable reversing valve for controlling the application of fluid pressure to opposite sides of said piston, a spring disposed within the cylinder at each end thereof, said springs being engaged by said piston adjacent the ends of its normal working stroke, each spring having operative connection with said reversing valve whereby the piston may be maintained in a state of continuous movement, and manually controlled means engageable with said reversing valve for preventing movement thereof in one direction so as to increase the stroke of said piston and thereafter interrupt movement of said piston.

8. A fluid motor including in combination, a cylinder having a pair of parallel bores, a reciprocable piston disposed in one of said cylinder bores capable of fluid pressure actuation in both directions, a reciprocable reversing valve disposed in the other of said cylinder bores for controlling the application of fluid pressure to opposite sides of said piston, a spring disposed at each end of said one bore, said springs being engaged by said piston adjacent the ends of its normal working stroke, each spring having operative connection with said reversing valve whereby said piston may be maintained in a state of continuous movement through actuation of said reversing valve by said springs at each end of the normal working stroke of said piston, and a manually controlled plunger disposed in said reversing valve bore and engageable with said reversing valve to prevent movement thereof in one direction so as to interrupt piston reciprocation.

9. A fluid motor including in combination, a cylinder having a pair of parallel bores, a reciprocable piston disposed in one of said bores capable of fluid pressure actuation in both directions, a reciprocable reversing valve disposed in the other of said bores for controlling the application of fluid pressure to opposite sides of said piston, a spring disposed at each end of said one bore, said springs being engaged by said piston adjacent the ends of its normal working stroke, each spring having operative connection with said reversing valve whereby said piston may be maintained in a state of continuous reciprocation, and manually controlled means engageable with said reversing valve for preventing movement thereof in one direction so as to increase the stroke of said piston and thereafter interrupt reciprocation of said piston.

References Cited in the file of this patent

UNITED STATES PATENTS

| | | |
|---|---|---|
| 1,839,540 | Farr | Jan. 5, 1932 |
| 1,853,758 | Brumm | Apr. 12, 1932 |
| 2,247,508 | Lawler | July 1, 1941 |
| 2,361,244 | Smith | Oct. 24, 1944 |
| 2,380,607 | Nystrom | July 31, 1945 |
| 2,421,194 | Given | May 27, 1947 |
| 2,511,181 | Sivacek | June 13, 1950 |
| 2,584,229 | Sacchini | Feb. 5, 1952 |
| 2,616,400 | Sprague et al. | Nov. 4, 1952 |
| 2,661,726 | Alfieri | Dec. 8, 1953 |
| 2,664,074 | O'Shei | Dec. 29, 1953 |